United States Patent [19]
Horiuchi et al.

[11] Patent Number: 6,069,662
[45] Date of Patent: May 30, 2000

[54] APPARATUS FOR DISPLAYING A PLURALITY OF COMPRESSED IMAGES

[75] Inventors: Tadasu Horiuchi, Yokohama; Koichi Ono, Yokosuka; Kazuya Yamashita, Hitachinaka, all of Japan

[73] Assignee: Hitachi, Ltd., Tokyo, Japan

[21] Appl. No.: 08/738,595

[22] Filed: Oct. 29, 1996

[30] Foreign Application Priority Data

Oct. 31, 1995 [JP] Japan .................................. 7-283627

[51] Int. Cl.[7] .............................. H04N 7/01; H04N 11/20
[52] U.S. Cl. .................... 348/446; 348/581; 348/559; 348/564; 348/588; 348/568; 348/715
[58] Field of Search .................... 348/581, 559, 348/564, 588, 560, 565, 567, 839, 840, 568, 705, 715, 446

[56] References Cited

U.S. PATENT DOCUMENTS

| | | | |
|---|---|---|---|
| 4,010,466 | 3/1977 | Hofstein | 342/185 |
| 4,266,242 | 5/1981 | McCoy | 348/558 |
| 4,272,787 | 6/1981 | Michael et al. | 348/559 |
| 4,636,864 | 1/1987 | Annegarn et al. | 348/731 |
| 4,652,908 | 3/1987 | Fling et al. | 348/625 |
| 4,679,084 | 7/1987 | Topper et al. | 348/559 |
| 4,750,038 | 6/1988 | Welles et al. | 348/565 |
| 4,750,039 | 6/1988 | Willis | 348/565 |
| 4,758,892 | 7/1988 | Bloomfield | 348/585 |
| 4,811,103 | 3/1989 | Casey | 348/565 |
| 4,821,086 | 4/1989 | McNeely et al. | 348/566 |
| 4,839,728 | 6/1989 | Casey | 348/565 |
| 5,016,106 | 5/1991 | Yong-Je et al. | 348/565 |
| 5,021,887 | 6/1991 | Park | 348/505 |
| 5,161,012 | 11/1992 | Choi et al. | 348/564 |
| 5,519,448 | 5/1996 | Nagasawa et al. | 348/559 |

FOREIGN PATENT DOCUMENTS

| | | |
|---|---|---|
| 0301488 | 2/1989 | European Pat. Off. . |
| 0527632 | 2/1993 | European Pat. Off. . |
| 5-46147 | 7/1993 | Japan . |
| 2222048 | 2/1990 | United Kingdom . |
| 92/17035 | 10/1992 | WIPO . |

*Primary Examiner*—John K. Peng
*Assistant Examiner*—Linus H. Lo
*Attorney, Agent, or Firm*—Antonelli, Terry, Stout & Kraus, LLP

[57] ABSTRACT

An apparatus for displaying a plurality of compressed images is disclosed, in which a high quality freeze display is made possible with a high vertical resolution and a multiplicity of compressed images can be displayed at the same time on the display screen without increasing the circuit scale extremely. Different video signals are processed for image compression in a plurality of processing circuits, and a synthesized image is supplied to a display unit for displaying four compressed images on the display screen at the same time. In the case of an image sequence display, the image size is compressed into one half in horizontal and vertical directions respectively by the processing circuits, and the odd and even fields are separately written in field memories. Also, in the case of freeze display, all the lines are written alternately in the field memories without compressing them vertically by a filter circuit. In either display mode, the data are read at high speed from the field memory for odd fields, and from the field memory for even fields.

27 Claims, 10 Drawing Sheets

FIG. 4
| FIELD MEMORY 21 | FIELD MEMORY 22 |
|---|---|
| E1<br>E3<br>E5<br>E7<br>⋮ | 01<br>03<br>05<br>07<br>⋮ |
FIG. 5A
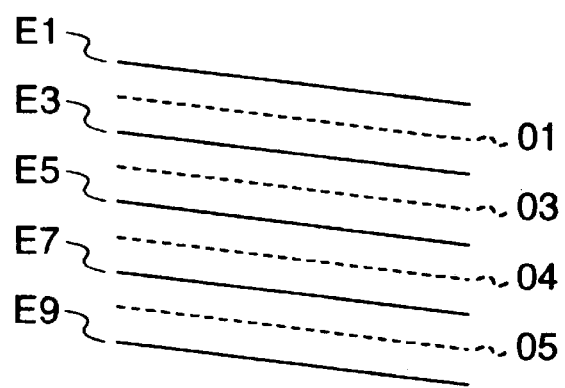
FIG. 5B
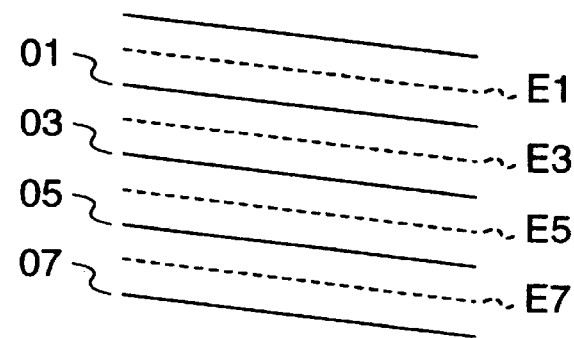

| FIELD MEMORY 21 | FIELD MEMORY 22 |
|---|---|
| L1 | L2 |
| L3 | L4 |
| L5 | L6 |
| L7 | L8 |
| ⋮ | ⋮ |

FIG. 11

| a | b | e | f |
|---|---|---|---|
| c | d | g | h |
| i | j | m | n |
| k | l | o | p |

FIG. 12

| FIELD MEMORY 21 | FIELD MEMORY 22 |
|---|---|
| E1 | 03 |
| E5 | 07 |
| E9 | 011 |
| E13 | 015 |
| ⋮ | ⋮ |

| FIELD MEMORY 21 | FIELD MEMORY 22 |
|---|---|
| L1<br>L5<br>L9<br>L13<br>⋮ | L3<br>L7<br>L11<br>L15<br>⋮ |

FIG. 15A
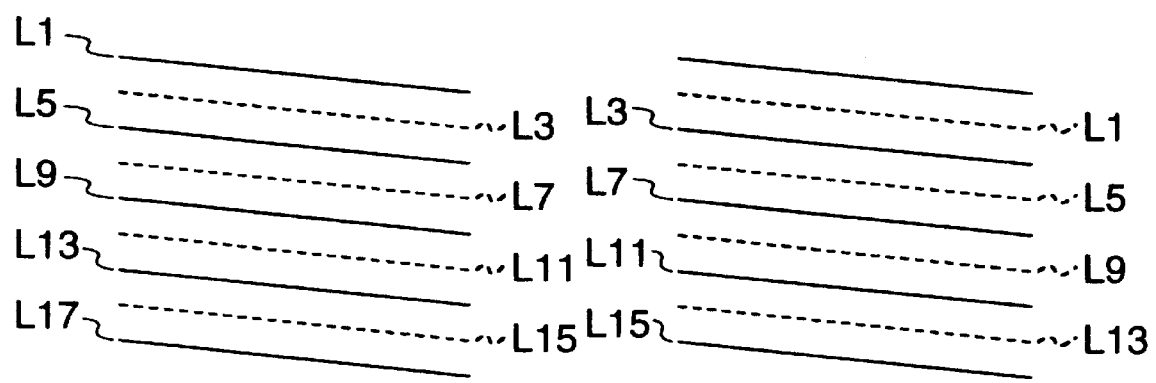
FIG. 15B
FIG. 16
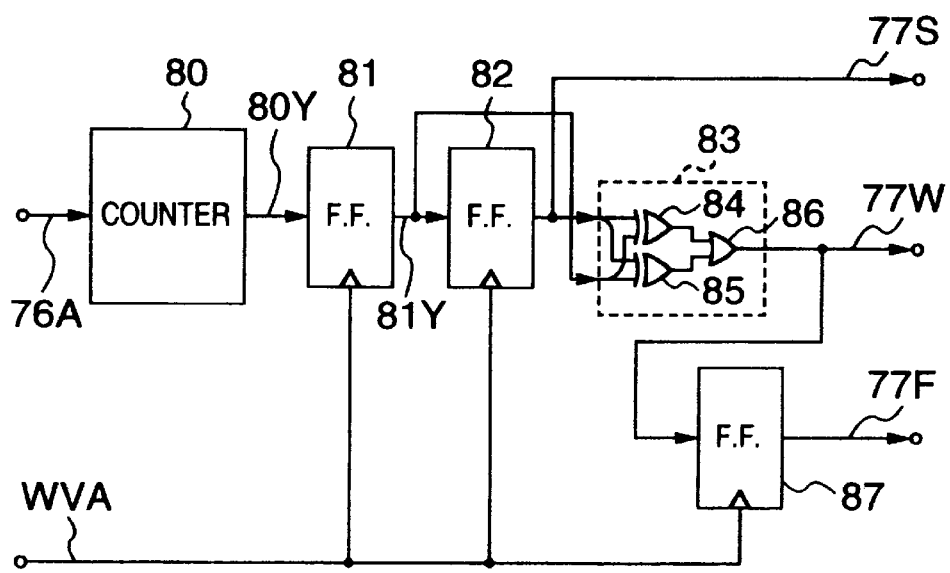

APPARATUS FOR DISPLAYING A PLURALITY OF COMPRESSED IMAGES

BACKGROUND OF THE INVENTION

The present invention relates to a display apparatus for compressing a plurality of images based on a plurality of video signals and displaying a plurality of the compressed images on a single display screen.

An example of an apparatus for compressing and displaying images of a video signal is a multi-screen section generating circuit as described in JP-B2-5-46147. In this apparatus, video signals of compressed images are written in a memory, read out and displayed on a single screen. By differentiating the write position in the memory for each video signal, a plurality of compressed images are displayed on a single screen at a time. In this conventional apparatus, although the video signal which has been written is displayed as a frozen image, the freeze display is not described in detail.

SUMMARY OF THE INVENTION

Generally, in the case of a frame-freeze display with a frame, i.e., two fields of video signal are written in a memory in an interlacing scheme, a frozen image of high vertical resolution is obtained in the absence of image motion. When the image has a motion, however, the frozen image fluctuates or flickers and presents an ugly appearance on the screen.

In the field freeze display for displaying a field of video signal repetitively, by contrast, images are free of fluctuations, but the vertical resolution thereof is undesirably reduced to one half that of the frame-freeze display. In the case where the video signal is skipped every other line to compress the image to one half for field-freeze display, for example, the vertical resolution is reduced to one fourth in spite of the fact that the vertical size of the image is compressed to one half. In the case where the user freezes an image, he is considered to be interested in the image for that particular moment. The resolution, therefore, is preferably as high as possible.

In security systems, demand is high for displaying a plurality of asynchronous image sequences taken by a plurality of cameras on the same display screen at a time. In such a case, as many memory write systems as input video signals are generally required. When an attempt is made to display 16 images on the same display screen at a time, for example, 16 signal processing circuits are required, thereby leading to an extremely large circuit configuration.

A first object of the present invention is to provide a compressed image display apparatus capable of freeze display of high-quality compressed images with a high vertical resolution.

A second object of the invention is to provide a compressed image display apparatus capable of displaying a multiplicity of compressed video signals with a sufficiently high temporal resolution without extremely increasing the circuit size.

In order to achieve the first object, according to the present invention, there is provided a compressed image display apparatus wherein the video signal of a field immediately before freezing stops being skipped or is skipped in smaller degree in vertical direction for image compression. The sampling points in vertical direction are thus increased to double that for image sequences, and are decomposed into two fields and written in memory, so that the two fields are displayed in pseudo-frame freeze state.

As a result, the freeze display is made possible of a compressed image higher in vertical resolution than image sequence display. Also, the motion is not fluctuated since a pseudo-frame signal is produced from a field of video signal.

In order to achieve the second object, according to the present invention, there is provided a compressed image display apparatus wherein a multiplicity of input video signals are divided into a plurality of groups, and a plurality of video signals are switched at high speed for each group using as many processing circuits as the groups.

As a consequence, a pseudo image sequence display is made possible as a freeze display by switching the input video signals for each group at high speed and also by switching the freeze display at high speed. An image of a multiplicity of video signals can thus be displayed by compression at a time without extremely increasing the number of circuits.

BRIEF DESCRIPTION OF THE DRAWINGS

FIG. 4 is a diagram showing a video signal of each line written in an image memory unit at the time of image sequence display according to the first embodiment of FIG. 1.

FIGS. 5A and 5B are diagrams showing each line of the video signal read from the image memory unit at the time of image sequence display according to the first embodiment of FIG. 1.

FIG. 11 is a model diagram showing a display screen according to the second embodiment of FIG. 10.

FIG. 12 is a diagram showing the field of the video signal written in a field memory according to the second embodiment of the invention.

FIGS. 15A and 15B are diagrams showing each line field of the video signal read from the image memory unit at the time of freeze display according to the second embodiment of FIG. 10.

FIG. 16 is a block diagram showing a specific example of an image select circuit in FIG. 10.

DESCRIPTION OF THE PREFERRED EMBODIMENTS

Embodiments of the invention will be described below.

Figure 1:
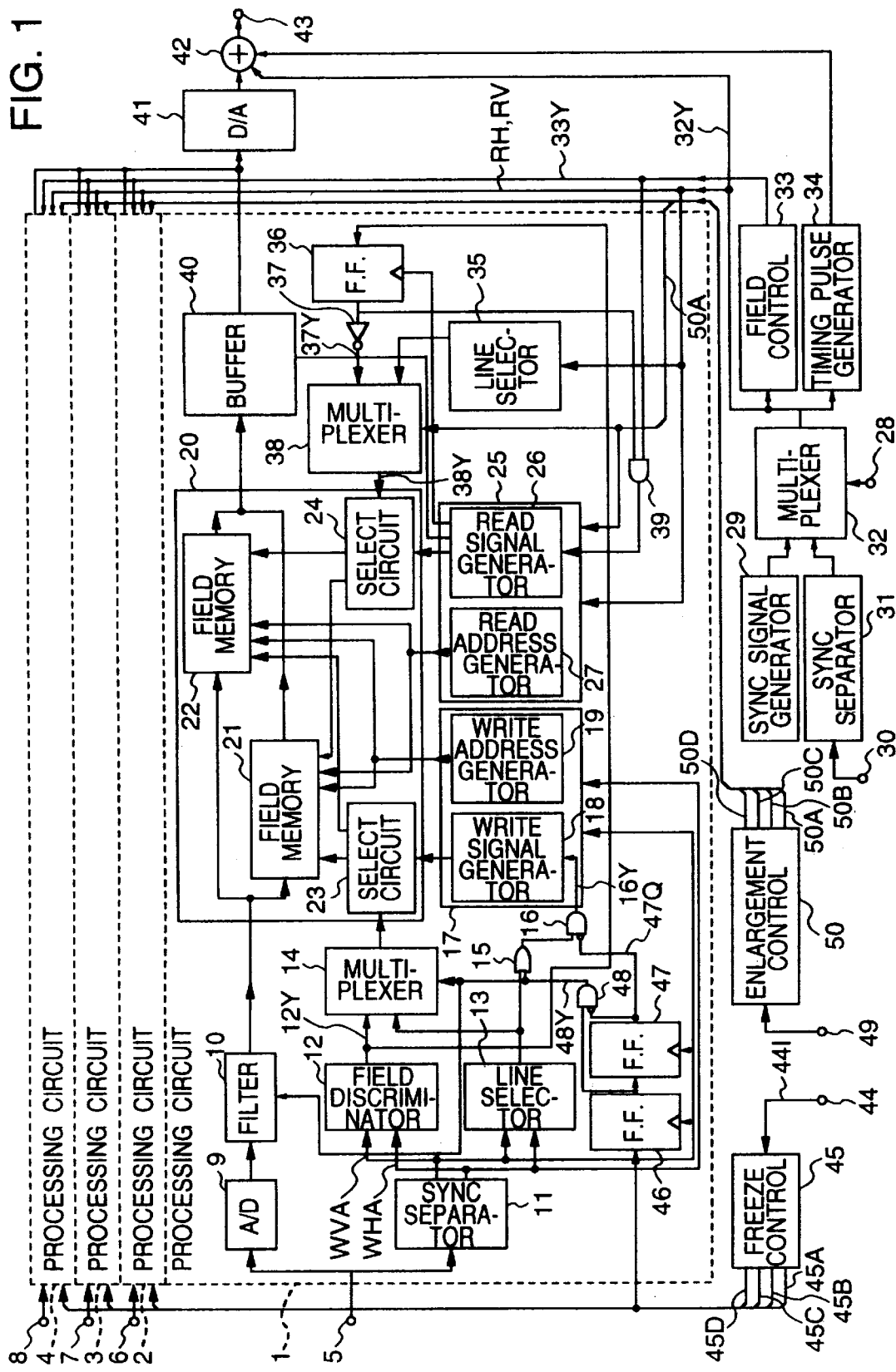
FIG. 1 is a block diagram showing a compressed image display apparatus according to a first embodiment of the present invention.

FIG. 1 is a block diagram showing a compressed image display apparatus according to a first embodiment of the present invention. Reference numerals 1 to 4 designate processing circuits, numerals 5 to 8 video signal input terminals, numeral 9 an A/D converter, numeral 10 a filter circuit, numeral 11 a sync separator circuit, numeral 12 a field discrimination circuit, numeral 13 a line select circuit, numeral 14 a multiplexer, numeral 15 an OR circuit, numeral 16 an AND gate, numeral 17 a write control circuit, numeral 18 a write signal generating circuit, numeral 19 a write address generating circuit, numeral 20 an image memory unit, numerals 21, 22 field memories, numerals 23, 24 select circuits, numeral 25 a read control circuit, numeral 26 a read signal generating circuit, numeral 27 a read address generating circuit, numeral 28 a sync mode signal input terminal, numeral 29 a sync signal generating circuit, numeral 30 an external sync signal input terminal, numeral 31 a sync separator circuit, numeral 32 a multiplexer, numeral 33 a field discrimination circuit, numeral 34 a timing pulse generating circuit, numeral 35 a line select circuit, numeral 36 a flip-flop circuit, numeral 37 an inverter circuit, numeral 38 a multiplexer, numeral 39 an AND gate, numeral 40 a buffer circuit, numeral 41 a D/A converter, numeral 42 an adder, numeral 43 a video signal output terminal, numeral 44 a freeze mode signal input terminal, numeral 45 a freeze control circuit, numerals 46, 47 flip-flop circuits, numeral 48 an AND gate, numeral 49 an enlargement mode signal input signal, and numeral 50 an enlargement control circuit.

Figure 2:
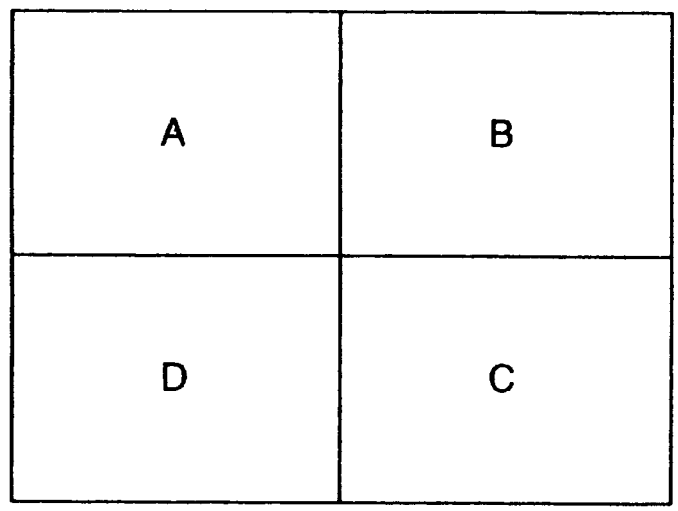
FIG. 2 is a model diagram showing a display screen according to the first embodiment of FIG. 1.

According to this embodiment, four asynchronous input video signals are processed in such a manner that each original image size is reduced to one fourth (one half longitudinally and one half laterally) to display four compressed images in four divided parts of the same screen. FIG. 2 shows a display screen thus divided into four parts.

Generally, in the case where n compressed images are displayed at a time on a single display screen, n video signals subjected to image compression processing are written in an image memory unit having a storage capacity of at least a screen, and these signals are collectively read and displayed at the same time. In such a case, the n input video signals are asynchronous image sequence signals, and in order to display them at a time as image sequences, the storage area of the image memory is required to be divided into n parts, into which the n input video signals are required to be written asynchronously and independently of each other.

The apparatus according to the first embodiment, as shown in FIG. 1, comprises processing circuits 1 to 4 each including an image memory unit 20 capable of storing two fields of video signal of ¼ image size and a control circuit. A video signal for an image compressed to ¼ is written in the image memory unit 20 of each processing circuit. The operations of the four systems are similar to each other. Only one system, i.e., the processing circuit 1, therefore, will be described in detail below.

The processing circuits 1, 2, 3, 4 in FIG. 1 are for processing the video signals of images compressively displayed in the upper left, the upper right, the lower left and the lower right parts of the display screen, i.e., in areas A, B, C, D, respectively, of the display screen shown in FIG. 2.

First, explanation will be made about the write operation of the image memory unit 20 for image sequence display.

In FIG. 1, the input video signal from the input terminal 5 is converted into a digital signal by the A/D converter 9, filtered horizontally and vertically by the filter circuit 10, and then is supplied to the image memory unit 20. This filter operation is for skipping in vertical and horizontal directions to reduce the image size to one half, respectively, and removes the band components more than one half of the skipping frequency. This operation is based on what is called the sampling theorem which will not be described. The vertical filter operation is turned on and off by a control pulse.

The sync separator circuit 11 separates the horizontal sync signal WHA and the vertical sync signal WVA of the input video signal applied from the input terminal 5. On the basis of the horizontal sync signals WHA and the vertical sync signal WVA, the field discrimination circuit 12 decides whether the present field of the input video signal is an even field or an odd field taking advantage of the fact that the odd fields and the even fields are displaced by one half of the horizontal period at the starting point of horizontal scanning. The field discrimination circuit 12 thus produces a field decision signal 12V indicating the result of the discrimination. This discrimination method is well known.

The line select circuit 13 generates a control pulse which is reversed by line in such a manner as to be "H" on odd-numbered lines and "L" on even-numbered lines on the basis of the vertical sync signal WVA and the horizontal sync signal WHA from the sync separator circuit 11. This control pulse is used for writing the odd-numbered lines (lines 1, 3, 5 and so on) during the effective display period of the video signal into the image memory unit 20 in order to thin out the image of the input video signal vertically and reduce the size thereof to one half. The control pulse, therefore, rises to "H" at write timings of odd-numbered lines.

The write control circuit 17 includes a write signal generating circuit 18 and a write address generating circuit 19. The write signal generating circuit 18 generates a write clock pulse from the horizontal sync signal WHA and the vertical sync signal WVA and applies the write clock pulse to the image memory unit 20.

This write clock pulse, which has a different specification according to the type of the image memory unit 20 used, corresponds to a row address strobe signal, a column address strobe signal or a write enable signal for a general-purpose memory IC. The write clock pulse is generated in such a manner as to thin out the image to one half horizontally by writing every other pixel.

The write signal generating circuit 18 is controlled as to whether to write or not by control signal 16Y form the AND gate 16. In image sequence display, the outputs of the flip-flops 46, 47 are "L" and therefore the output of the AND gate 48 is also "L". As a result, the OR circuit 15 and the AND gate 16 are in through state, so that the write clock signal is generated on the odd-numbered lines during the effective display period in accordance with the control pulse output from the line select circuit 13.

The write address generating circuit 19 generates an address signal representing the addresses of the field memories 21, 22 in one-to-one correspondence with the pixel positions on the display screen on the basis of the horizontal sync signal WHA and the vertical sync signal WVA. The address signal thus generated is applied to the image memory unit 20.

The image memory unit 20 includes field memories 21, 22 and select circuits 23, 24. The field memories 21, 22 each have a storage capacity of at least one field of image data of the video signal compressed to ¼ in size. The select circuit 23 is for selecting which of the field memories 21, 22 to write data in. The select circuit 24 is for selecting which of the field memories 21, 22 to read data from.

The multiplexer 14 outputs a signal from the line select circuit 13 when the output of the AND gate 48 is "H", and outputs a signal from the field discrimination circuit 12 when the output of the AND gate 48 is "L".

In image sequence display, the output of the AND gate 48 is "L", and therefore the multiplexer 14 selects and outputs the field discrimination signal 12Y from the field discrimination circuit 12. Consequently, the select circuit 23 is controlled by being switched by field according to the field discrimination signal 12Y, and supplies the write clock pulse from the write signal generating circuit 18 to the field memory 21 or 22. It is assumed here that the image data of the video signal of the even fields is written in the field memory 21, and the image data of the video signal of the odd fields is written in the field memory 22.

Figure 3:
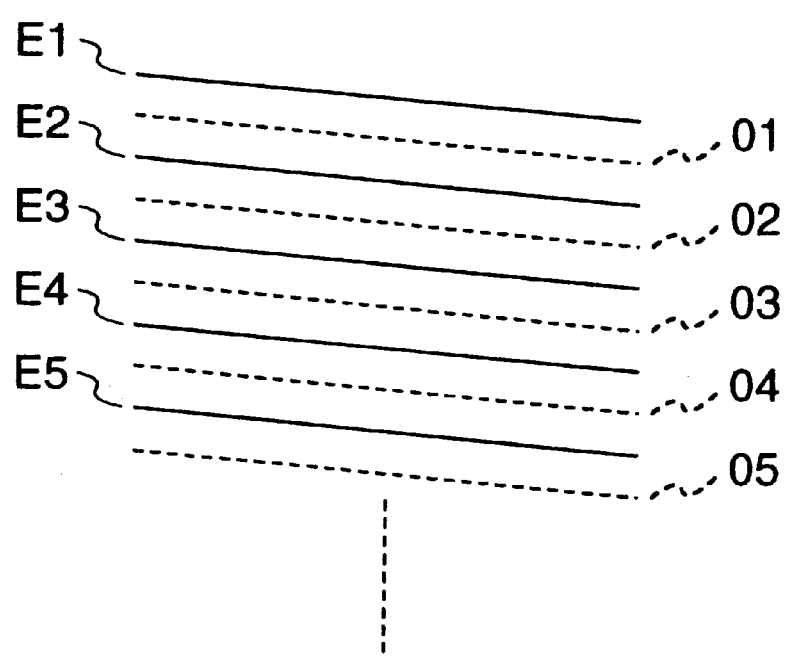
FIG. 3 is a diagram showing a model of the effective display period portion of an input video signal according to the first embodiment of FIG. 1.

FIG. 3 is a model diagram showing the effective display period portion of the input video signal from the input terminal 5. Solid lines E1, E2, E3, E4 and so on represent even-numbered field line signals, and dotted lines 01, 02, 03, 04 and so on represent odd-numbered field line signals.

In this embodiment, the first line E1 in the even fields is assumed to be located on the first line 01 of the odd fields on the display screen.

In compressed image sequence display, the vertical skipping operation described above causes the lines E1, E3, E5, E7 and so on to be written in the field memory 21 on even fields, and causes the lines 01, 03, 05, 07 and so on to be written in the field memory 22 on the odd fields.

FIG. 4 is a diagram showing the video signal of each line written in the field memories 21, 22, in which lines corresponding to those in FIG. 3 are designated by the same reference numerals, respectively.

As shown in FIG. 4, the video signal on the odd-numbered lines of even fields is written in the field memory 21, while the video signal on the even-numbered lines of odd fields is written in the field memory 22.

The above-mentioned operation makes it possible to write a video signal compressed to a ¼ image to be written in the image memory unit 20.

Now, explanation will be made about the read operation of the image memory 20 for image sequence display.

The multiplexer 32 is for selecting the sync mode from the signal input by the user from the input terminal 28. In the case where the external sync mode is designated, the multiplexer 32 selects the sync signal separated by the sync separator circuit 31 for the external video signal input from the input terminal 30. In the case where the internal sync mode is designated, on the other hand, the sync signal generated by the sync signal generating circuit 29 is selected.

The read control circuit 25 includes a read signal generating circuit 26 and a read address generating circuit 27. The read signal generating circuit 26 generates a read clock pulse at a timing for displaying a compressed image in the area A on the display screen shown in FIG. 2 on the basis of the sync signal 32Y from the multiplexer 32. The read clock pulse thus generated is applied to the image memory unit 20. A timing pulse required for the reading operation described later is also generated.

The read address generating circuit 27 generates a read address signal and applies it to the image memory unit 20 in such a manner as to read the video signal of a compressed image written in the image memory unit 20 at a timing of the area A on the display screen shown in FIG. 2 on the basis of the horizontal sync signal RH and the vertical sync signal RV of the sync signal 32Y from the multiplexer 32. The read control circuit described above is well known.

The select circuit 24 is for selecting which output to be displayed, from field memory 21 or from field memory 22, and is controlled by the control signal 38Y from the multiplexer 38. The read clock pulse from the read signal generating circuit 26 is applied to the field memory 21 or 22.

In the case where an image sequence is displayed in compressed form using a memory, the read speed of the memory is generally higher than the write speed thereof, and therefore the address read operation outruns the address write operation. Before this outrun occurs, new image data after write operation are read. After the outrun, however, the old image data before write operation are read out. For this reason, the time lag occurs between the upper and lower parts of each compressed image on the display screen, thereby presenting an ugly look of the image.

According to this embodiment, the field memory 21 or 22 that has not been written at the time point of starting the reading is selected for read operation. The outrun can thus be avoided. In other words, the field discrimination signal 12Y from the field discrimination circuit 12 indicates whether the field written in the memory 20 is an odd- or even-numbered. This signal 12Y is stored in the flip-flop circuit 36 by the timing signal applied from the read signal generating circuit 26 for starting to read the image memory unit 20. The output signal of the flip-flop circuit 36 is inverted by the inverter 37 as a signal 37Y, which is applied as a select control signal for the select circuit 24. Consequently, the field memory not written in is read out.

Whether the display screen to be read is an even field or an odd field is determined by the sync signal generated by the sync signal generating circuit 29 in the internal sync mode, and by the sync signal of the external video signal from the input terminal 30 in the external sync mode. As described above, the read select control of the field memories 21, 22 is dependent on the write field discrimination signal 12Y, the write and read operations are asynchronous with each other, and the odd and even fields may be inverted by the functions of the flip-flop and the inverter. The odd and even fields read from the field memories 21, 22, therefore, are not always coincident with those of the actual display screen.

In the case of this coincidence failure, the vertical positions of the lines of the even and odd fields are reversed, resulting in an ugly image appearance.

In the case where the odd and even fields in the above-mentioned two cases fail to coincide with each other, the even or odd fields are read displaced by one line thereby to prevent the vertical reversal of line positions.

More specifically, in the case where an image of an even field is displayed as an odd field, the read operation is advanced by one line, while when an image of an odd field is displayed as an even field, the read operation is delayed by one line. For the read operation to be advanced by one line (or to be delayed by one line), the read start timing is advanced by one line (or delayed by one line). Alternatively, the read address is subtracted (added) by an amount equivalent to one line.

According to this embodiment, in the case where the video signal of an odd field is read and displayed as an even field, i.e., in the case where the output signal of the flip-flop circuit 36 is "H" so that the field discrimination signal 33Y from the field discrimination circuit 33 is "H", then the output signal of the AND gate 39 becomes "H". In such a case, the image data of an odd field is read out during the period when an even field is read and displayed. The read address signal, therefore, is generated by the read address generating circuit 27 in such a manner as to delay the read operation of an odd field by one line.

FIGS. 5A and 5B are diagrams showing the signals read out from the image memory unit 20 by the operation described above. As in FIG. 3, the solid lines represent each line of even fields of the display screen, and the dotted lines indicate each line of odd fields of the display screen. The reference characters and numerals attached to each line are similar to those attached to each line of the input video signal shown in FIG. 3.

FIG. 5A represents the case in which the odd and even fields of the video signal written in the image memory unit 20 coincide with those of the display screen. FIG. 5B, on the other hand, shows the case in which the odd and even fields written in the memory fail to coincide with those of the display screen. In this case, the display of the odd fields is seen to be delayed by one line.

As described above, the vertical order of the lines is not reversed between even and odd fields on the display screen.

The buffer circuit 40 activates the video signal of a compressed image read from the image memory unit 20, at the display timing of the display area A shown in FIG. 2. The timing signal for this activation is generated by the read signal generating circuit 26. This video signal is synthesized with the video signals of compressed images for the areas B, C, D output from the processing circuits 2, 3, 4 in similar fashion. The resulting synthesis signal is converted into an analog signal by the D/A converter 41. Further, this synthesis signal is applied to the adder 42 for adding thereto the sync signal 32Y from the multiplexer 32 and the blanking pulse from the timing pulse generating circuit 34. The resulting signal is output from the output terminal 43 and is applied to a monitor not shown, so that as shown in FIG. 2, compressed image sequences are displayed in the four areas A, B, C, D into which the display screen is divided.

Now, explanation will be made about the operation of freeze (still image) display of a compressed image.

According to this embodiment, the write operation of the video signal in the image memory unit 20 is suspended during the freeze display. Further, in the field immediately before suspension of the write operation, all the lines for the effective display period are written in the field memories 21, 22. In this way, a frozen image can be displayed with a high vertical resolution.

Figures 6, 7:
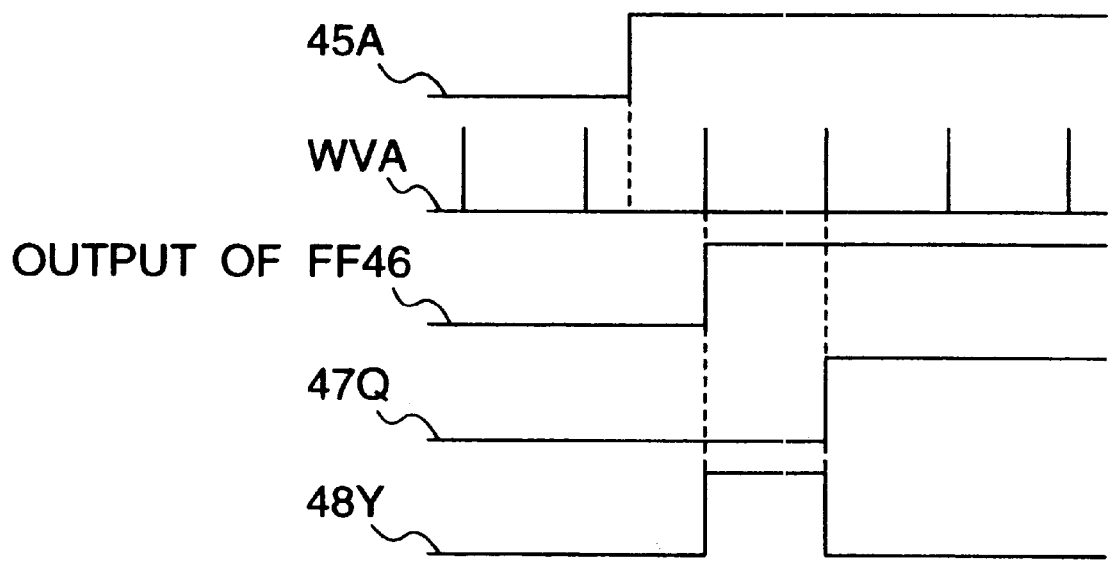
FIG. 6 is a timing chart showing each signal of FIG. 1 for freeze operation according to the first embodiment of FIG. 1.
FIG. 7 is a diagram showing the video signal written in the image memory unit at the time of freeze operation according to the first embodiment of FIG. 1.

FIG. 6 is a timing chart showing the main signals in FIG. 1 for the freeze operation. The signals corresponding to those in FIG. 1 are denoted by the same reference numerals as the corresponding signals in FIG. 1, respectively.

Assume that the user designates the freeze mode by way of an operating panel not shown in FIG. 1. A freeze mode signal 44I is input from the input terminal 44. The freeze control circuit 45, upon receipt of the freeze mode signal 44I, generates and supplies freeze an instruction signal 45A, 45B, 45C or 45D to the desired one of the four processing circuits 1 to 4. According to this embodiment, the freeze instruction signals 45A to 45D are assumed to become "H" for freeze display.

The flip-flops 46 and 47 are operated to produce an output of the same level as the input thereto in synchronism with the vertical sync signal WVA from the sync separator circuit 11.

Now, suppose that the freeze instruction signal 45A in "H" state is applied to the processing circuit 1 in FIG. 6. The flip-flop circuit 46 outputs a "H" signal of the same level as the input thereto at a timing in synchronism with the vertical sync signal WVA from the sync separator circuit 11 first arriving after the freeze instruction signal 45A is input. The flip-flop circuit 47 in the next stage generates a "H" output signal 47Q in synchronism with the first vertical sync signal after the output of the flip-flop 46 becomes "H", which "H" output 47Q is delayed by one field. The freeze instruction signal 47Q thus delayed is applied inverted to the AND gate 16, so that the output signal 16Y of the AND gate 16 is reduced to "L". As a result, the generation of the write signal by the write signal generating circuit 18 is prohibited, and the write operation of the video signal to the image memory unit 20 is suspended.

The AND gate 48 is supplied with the output signal of the flip-flop circuit 46 and the inverted version of the output signal 47Q of the flip-flop 47. On the basis of these signals, a signal 48Y is generated which becomes "H" in the field immediately before the suspension of the write operation of the image memory unit 20 (FIG. 6).

In the field immediately before the write operation suspension, the filter circuit 10 is controlled by the output signal 48Y of the AND gate 48, and the vertical filter thereof is turned off. Also, the multiplexer 14 selects the output signal from the line select signal generating circuit 13 and applies it to the select circuit 23. As a result, the input video signal from the filter circuit 10 is written in the field memories 21 and 22 alternately every other line.

Also, in the field immediately before the write operation suspension, the output of the flip-flop 46 is "H" and the output of the flip-flop 47 is "L". Therefore, the output of the OR circuit 15 becomes "H" and is applied to the AND gate 16. Since the output signal 47Q of the flip-flop circuit 47 is "L", the output signal of the AND gate 16 becomes "H". The write signal generating circuit 18 thus generates a write clock signal and supplies it to the image memory unit 20 so that the write operation is performed for all the lines during the effective display period.

FIG. 7 is a diagram showing the video signals written in the field memories 21 and 22 during the freeze display. Characters L1, L2, L3, L4 and so on designate the line numbers for the effective display period in the field immediately before suspension of the write operation.

The select operation and the write signal control operation of the field memories 21 and 22 causes odd-numbered lines (lines 1, 3, 5 and so on) of the field immediately before the write operation suspension to be written in the field memory 21, and even-numbered lines (lines 2, 4, 6 and so on) to be written in the field memory 22.

The video signals of the field written in this way immediately before write operation suspension are read alternately from the field memories 21 and 22 by field in the same manner as in the image sequence display. A frozen image thus is displayed to form a frame from each two fields.

FIG. 8 is a diagram showing the signals read from the image memory unit 20 at the time of freeze display by the operation described above. Solid lines represent each scanning line of even-numbered fields, and dotted lines indicate each scanning line of odd-numbered fields of the display image. The characters L1, L2, L3, L4 and so on attached to each line designate lines 1, 2, 3, 4 and so on, respectively, during the effective display period of the field immediately before write operation suspension as in FIG. 7.

Figure 8A:
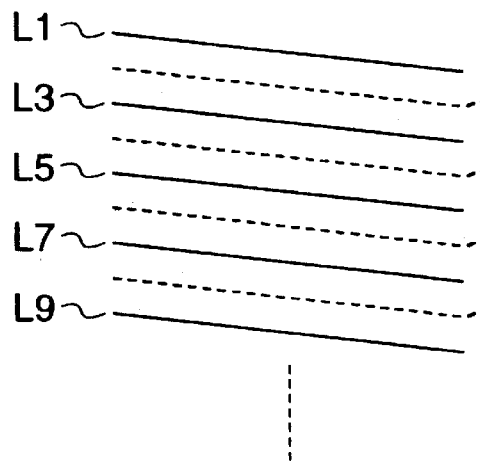
FIGS. 8A and 8B are diagrams showing the video signal read from the image memory unit at the time of freeze operation according to the first embodiment of FIG. 1.
Figure 8B:
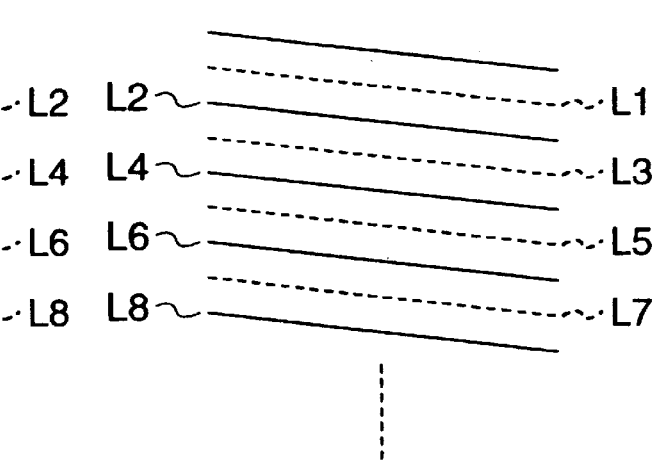

This freeze display, like the image sequence display, may develop the phenomenon of reversing the vertical positions of lines between the even- and odd-numbered fields. It is therefore necessary to correct by displacing the read address by one line in one of the two types of fields. This control operation is the same as in the case of image sequence display. FIGS. 8A and 8B show display screens not corrected and corrected, respectively.

Other parts of the read operation are identical to those for the image sequence display and will not be described further.

In the first embodiment shown in FIG. 1, the image memory unit 20 may be constituted as a memory unit having a storage capacity capable of storing two fields of images compressed to one fourth. In such a case, the select circuits 23, 24 are not required, and the select control signal for each select circuit is converted into an address signal and supplied to the frame memory.

Now, explanation will be made about the case in which the compressed image frozen by the method described above is enlarged and displayed in normal screen size.

In the case where the user designates the enlargement of a frozen image by way of the operating panel not shown in FIG. 1, an enlargement mode signal is applied through the input terminal 49. Upon receipt of the enlargement mode signal, the enlargement control circuit 50 generates an enlargement instruction signal 50A, 50B, 50C or 50D for the desired one of the four processing circuits 1 to 4. According to this embodiment, the enlargement instruction signal applied to the processing circuit for performing the enlarged display processing operation is assumed to become "H".

In the processing circuit 1, the line select circuit 35 outputs a "H" signal in odd-numbered lines (lines 1, 3, 5 and so on) and a "L" signal in even-numbered lines (lines 2, 4, 6 and so on) during the effective display period of the display screen on the basis of the sync signal 32Y output from the multiplexer 32. These signals are applied to the multiplexer 38.

Suppose that the enlargement instruction signal 50A supplied to the processing circuit 1 assumes a "H" level. The multiplexer 38 of the processing circuit 1 selects the output signal of the line select circuit 35 in accordance with the enlargement instruction signal 50A, and applies the same signal as a select control signal to the select circuit 24. As a result, the read operation is alternated between the field memory 21 and the field memory 22 for every other line.

Also, the read address generating circuit 27 enlarges to a normal one-line length and reads a line of the horizontally ½-compressed video signal by a well-known method in response to the input of the enlargement instruction signal 50A. Further, a read address signal is generated in such a manner that the read address is sequentially updated by a line each time a line of data is read alternately from the field memories 21 and 22.

Figure 9:
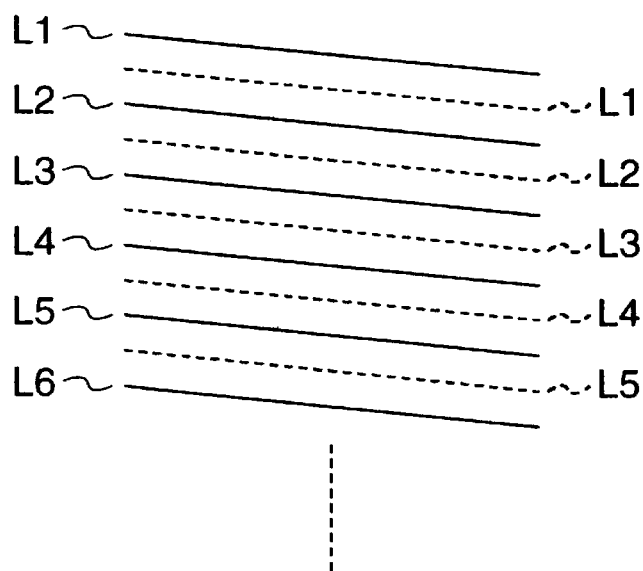
FIG. 9 is a diagram showing the video signal read from the image memory unit at the time of freeze display enlargement operation according to the first embodiment of FIG. 1.

FIG. 9 is a diagram showing a signal read out from the image memory unit 20 at the time of freeze display enlargement by the operation described above. Solid lines represent each scanning line of even fields, and dotted lines each scanning line of odd fields. The reference characters attached to each line designate the same meaning as those attached to each line of the input image signal shown in FIGS. 7 and 8.

As shown in FIG. 9, the read operation described above causes the video signals of all the lines during a field of effective display period to be read out sequentially thereby to display a field of frozen image on the display screen.

As described above, in the freeze display of compressed images according to this embodiment, the vertical filter is turned off and the video signal of all the lines of a field can be divided into two fields for every other line to effect freeze display. As compared with the method of freezing and displaying a field of compressed image by skipping lines, therefore, a high vertical resolution is obtained. Also, the compressed freeze screen can be displayed in a form enlarged to the normal screen size.

Figure 10:
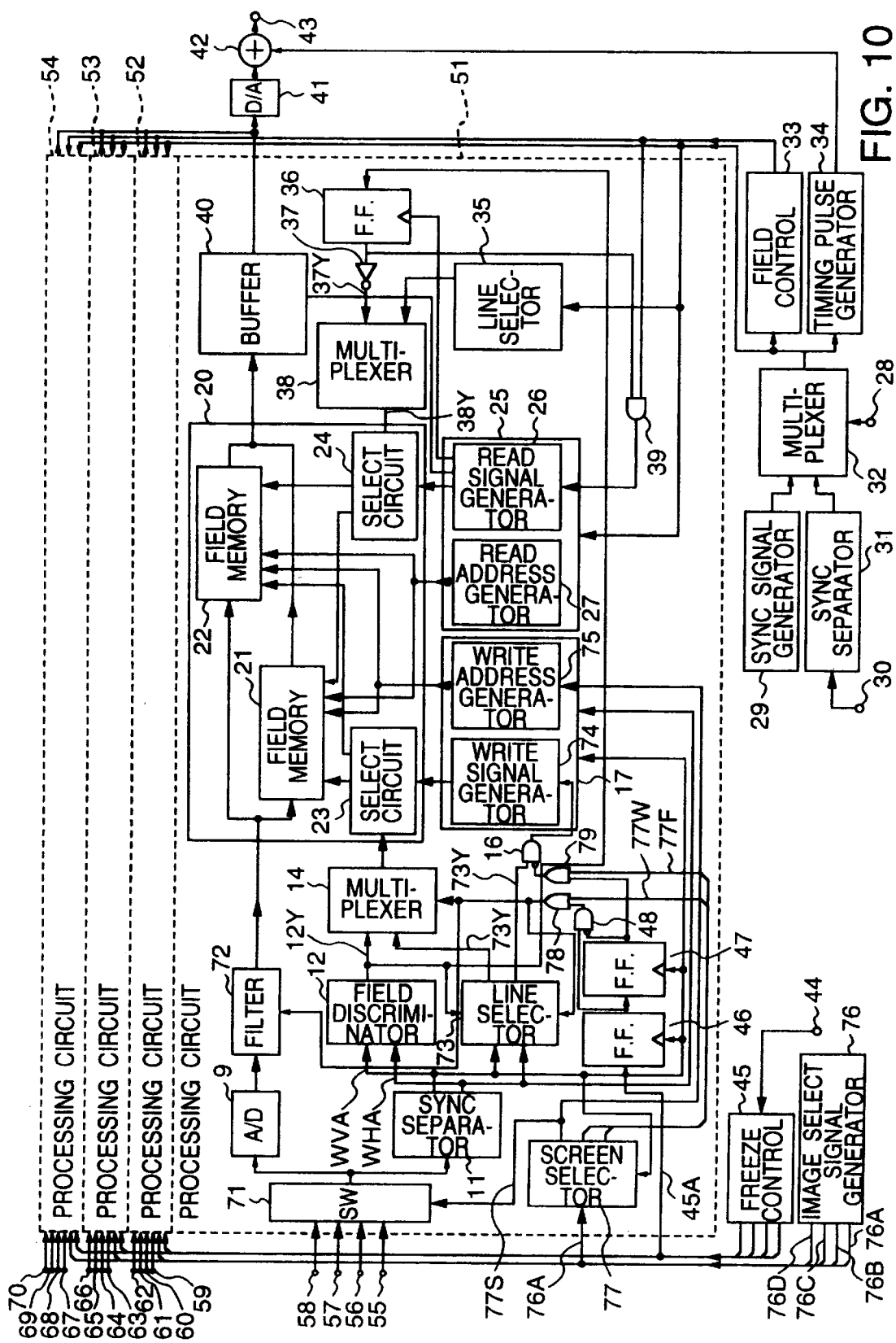
FIG. 10 is a block diagram showing a compressed image display apparatus according to a second embodiment of the invention.

FIG. 10 is a block diagram showing a compressed image display unit according to a second embodiment of the invention. Numerals 51 to 54 designate processing circuits, numerals 55 to 70 video signal input terminals, numeral 71 a switch circuit, numeral 72 a filter circuit, numeral 73 a line select circuit, numeral 74 a write signal generating circuit, numeral 75 a write address generating circuit, numeral 76 a screen select signal generating circuit, numeral 77 a screen select circuit, and numerals 78, 79 OR circuits. In FIG. 10, the component parts corresponding to those in FIG. 1 are designated by the same reference numerals, respectively, and will not be described any further.

This embodiment realizes an apparatus for displaying a maximum of 16 images of asynchronous input video signals compressed to 1/16 in size (¼ longitudinally and laterally respectively) at the same time in 16 parts of the same screen.

The apparatus of FIG. 10, like the first embodiment shown in FIG. 1, comprises four processing circuits 51 to 54 each including an image memory unit 20 capable of storing two fields of the original video signal of a ¼-size image and a control circuit. The video signal of an image compressed to 1/16 in size is written in each image memory unit 20. This operation is similar for all the four processing circuits 51 to 54. Only the processing circuit 51, therefore, will be described in detail.

FIG. 11 is a diagram showing a display screen according to the second embodiment. This display screen is divided into 16 parts a to p each representing a division of the display screen.

The processing circuit 51 is assumed to process the video signal for displaying an image in the four divided parts a, b, c, d in the upper left ones of the screen parts a to p. It is also assumed that the other processing circuits 52, 53, 54 process the video signals for displaying images in the four screen parts e to h in the upper right portion, the four screen parts i to l in the lower left portion, and the four screen parts m to p in the lower right portion, respectively.

Video signals asynchronous with each other are applied through 16 input terminals 55 to 70. The select signal generating circuit 76 generates control pulse signals 76A to 76D described later for selecting the input video signal and updating the display position on the display screen for the four processing circuits 51 to 54, respectively.

The screen select circuit 77, as described later, generates a control signal for switching the input video signals applied from the input terminals 55 to 58 and a control signal for selecting the display positions a to d of compressed images. On the basis of the control pulse signal 76A from the select signal generating circuit 76, a select control signal 77S, and control signals 77W, 77F are generated.

A switch circuit 71 switches the video signals from the input terminals 55 to 58 in accordance with the control signal 77S from the screen select circuit 77, and applies the resulting signal to the A/D converter 9 and the sync separator circuit 11.

The line select circuit 73 controls the write operation in the image memory unit 20 by line in order to thin out the video signals from the switch circuit 71 along the vertical direction of the image. In the image sequence mode, the line select circuit 73 thins out the scanning lines at the rate of one fourth vertically on the basis of the field discrimination signal 12Y, the horizontal sync signal WHA and the vertical sync signal WVA of the input video signal separated by the sync separator circuit 11. In other words, as shown in FIG. 12, the input video signals thus skipped are stored in the field memories 21, 22 separately for even and odd fields.

More specifically, the line select circuit 73 generates by a well-known method a control pulse 73Y by line which assumes a "H" level for each of the lines shown in FIG. 12, in such a manner that lines 1, 5, 9 and so on are written in the image memory unit 20 at intervals of four lines in even fields during the effective display period, and lines 3, 7, 11 and so on are written in the image memory unit 20 at intervals of four lines in odd fields during the effective display period. As a consequence, the control pulse 73Y assumes a "H" level for lines to be written.

The write signal generating circuit 74 of the write control circuit 17 generates a write clock pulse and supplies it to the image memory unit 20. In image sequence display, the output of the flip-flop 47 is "L". Also, as described later, the output 77F of the image select circuit 77 is "L" during the write period. The AND gate 16, therefore, is in through state. The write signal generating circuit 74 thus generates a write clock signal according to the control pulse 73Y from the line select circuit 73 into the mode of writing every fourth line during the effective display period.

The write address generating circuit 75 of the write control circuit 17 generates a write address signal indicating the addresses of the field memories 21, 22 in one-to-one correspondence with the display positions of the image data in the divided screen portions a to d shown in FIG. 11, on the basis of the horizontal sync signal WHA and the vertical sync signal WVA from the sync separator circuit 11. The write address signals are applied to the image memory unit 20.

The storage areas of the field memories 21, 22 are divided into four portions by address. The image data of the 1/16-compressed video signals are written in respective areas thus divided.

In image sequence display, the multiplexer 14 selects the field discrimination signal 12Y from the field discrimination circuit 12. As a consequence, as in the first embodiment of FIG. 1, the select circuit 23 selects the field memory 21 or 22 in accordance with the field discrimination signal 12Y. In this case, the image data of even fields are assumed to be written in the field memory 21, and the image data of odd fields in the field memory 22.

Suppose that each line of the input video signals from the input terminals 55 to 58 is designated by the same reference numerals as the corresponding parts in FIG. 3, respectively. In compressed image sequence display, the vertical image skipping operation described above results in every fourth lines E1, E5, E9, E13 and so on being written in the field memory 21 in even fields and every fourth lines 03, 07, 011, 015 and so on being written in the field memory 22 in odd fields.

FIG. 12 is a diagram showing each field of the video signal written in the field memories 21, 22. Each of these fields is designated by the same reference numerals as the corresponding fields in FIG. 3, respectively.

As shown in FIG. 12, the video signals of even fields are written in the field memory 21, and the video signals of odd fields are written in the field memory 22.

As a result of the above-mentioned operation, a 1/16-compressed video signal is written in one of the four storage areas into which the field memories 21, 22 are divided. The operation described later switches the input video signal so that other 1/16-compressed video signals of images are sequentially written in the remaining three areas.

The video signals thus written are read out at the display timing of the upper-left area a of the display screen as in the first embodiment, so that compressed images are displayed in the corresponding divided screen parts a, b, c, d, respectively, of the display screen shown in FIG. 11.

Figures 13A, 13B, 14:
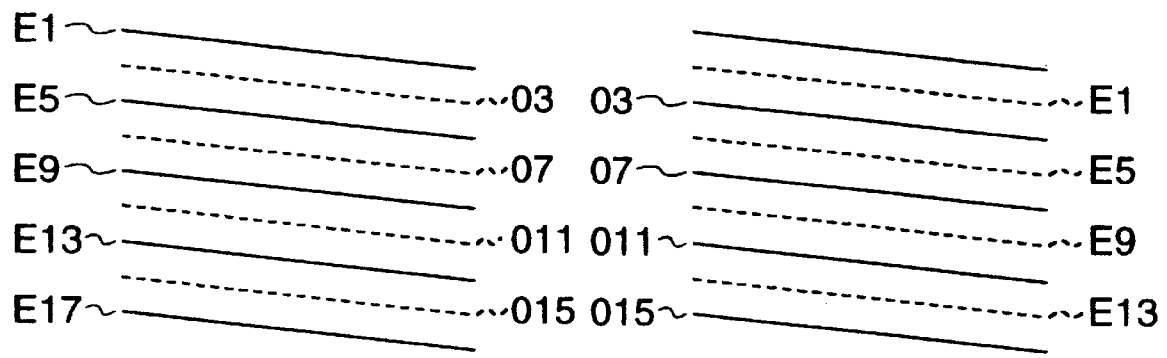
FIGS. 13A and 13B are diagrams showing each line of the video signal of image sequences displayed according to the second embodiment of FIG. 10.
FIG. 14 is a diagram showing each line field of the video signal written in the image memory unit at the time of freeze display according to the second embodiment of FIG. 10.

FIGS. 13A and 13B are diagrams showing video signals of image sequences displayed. Solid lines represent each scanning line of even fields, and dotted lines each scanning line of odd fields. Each scanning line is designated by the same reference numerals as the corresponding lines in FIG. 12, respectively.

As in the first embodiment shown in FIG. 1, the vertical positions of lines may be reversed between even and odd fields depending on the relation between write and read speeds of the image memory unit 20. In the same manner as described above, therefore, the reversal is corrected by displacing each read address by a line. FIGS. 13A and 13B show lines of the display image not corrected and corrected, respectively.

Now, explanation will be made about the freeze display operation according to the second embodiment.

Assume that a freeze instruction signal 45A is issued from the freeze control circuit 45 in response to an instruction from the operating panel or the like not shown in FIG. 10. As in the first embodiment shown in FIG. 1, the the combined operation of the flip-flop circuits 46, 47 and the AND gate 48 generates a "H" pulse signal indicating the field immediately before write suspension from the AND gate 48.

In the field immediately before write suspension, the filter circuit 72 is controlled by the "H" pulse signal supplied from the AND gate 48 through the OR circuit 78. The coefficient of the vertical filter of the filter circuit 72 thus is switched in such a manner that one of every two lines is removed, that is, in such a manner that the one-half skipping operation is performed in vertical direction of the image.

The line select circuit 73 generates a pulse signal 73Y which rises to "H" in odd-numbered lines (lines 1, 3, 5, 7 and so on) during the effective display period, which pulse signal 73Y is supplied through the AND gate 16 to the write signal generating circuit 74 of the write control circuit 17. The line select circuit 73 also generates a pulse signal 73Y2 alternating between "H" and "L" levels at intervals of two lines, i.e., a "H" signal in lines 1, 2, 5, 6, 9, 10 and so on, and a "L" signal in lines 3, 4, 7, 8, 11, 12 and so on. This pulse signal 73Y2 is supplied to the multiplexer 14, and the select circuit 23 is so controlled that a set of every fourth lines 1, 5, 9 and so on are written in the field memory 21 during the effective display period, and another set of every fourth lines 3, 7, 11 and so on are written in the field memory 22 during the effective display period. The multiplexer 14 passes the pulse signal 73Y2 from the line select circuit 73 in response to the "H" signal supplied from the AND gate 48 only during the field period immediately before write suspension. The select circuit 23 selects the field memory 21 or 22 in accordance with the pulse signal 73Y2. The write signal generating circuit 74 generates a write pulse in coincidence with the pulse signal 73Y. As a result, each line data are written in the field memories 21 and 22 alternately for odd-numbered lines as shown in FIG. 14.

FIG. 14 is a diagram showing each line of the video signal written in the field memories 21, 22 at the time of freeze display. Characters L1, L3, L5, L7 and so on designate lines 1, 3, 5, 7 and so on, respectively, for the effective display period of the field immediately before write suspension.

As a result of the above-mentioned write operation, lines 1, 5, 9 and so on are written in the field memory 21 and lines 3, 7, 11 and so on are written in the field memory 22 during the effective display period of the field immediately before write suspension.

A frozen image can be displayed by reading the video signal thus written in the field immediately before the write suspension alternately from the field memories 21 and 22 for every other field in the same manner as in the image sequence display.

FIGS. 15A, 15B are diagrams showing each line of the video signal read from the image memory unit 20 at the time of freeze display. Solid lines represent each scanning line of even fields, and dotted lines each scanning line of odd fields. Each line is designated by reference characters similar to those in FIG. 14.

The field memories 21 and 22 are selected for read operation in the same manner as in the image sequence display. As in the image sequence display, the vertical line positions are reversed. Each read address in one of the fields, therefore, is corrected by being displaced by one line. This control operation is similar to that for the image sequence display. FIGS. 15A and 15B show display video signals not corrected and corrected this way, respectively.

In the second embodiment shown in FIG. 10, the image memory unit 20 can be configured as a frame memory including one memory unit having a storage capacity sufficient to store two fields of image data of four 1/16-compressed screen parts. In this case, the select circuits 23 and 24 are eliminated, and the select control signal of each select circuit is applied as an address signal of each frame memory.

Now, the switching operation of the input video signal and the the screen position will be explained.

FIG. 16 is a block diagram showing a specific example of the screen select circuit 77 in FIG. 10. Numeral 80 designates a counter, numerals 81, 82 flip-flop circuits, numeral 83 a comparator circuit, numerals 84, 85 exclusive OR circuits, numeral 86 an OR circuit, and numeral 87 a flip-flop circuit. Signals in FIG. 16 are designated by the same reference numerals as the corresponding signals in FIG. 10, respectively.

Figure 17:
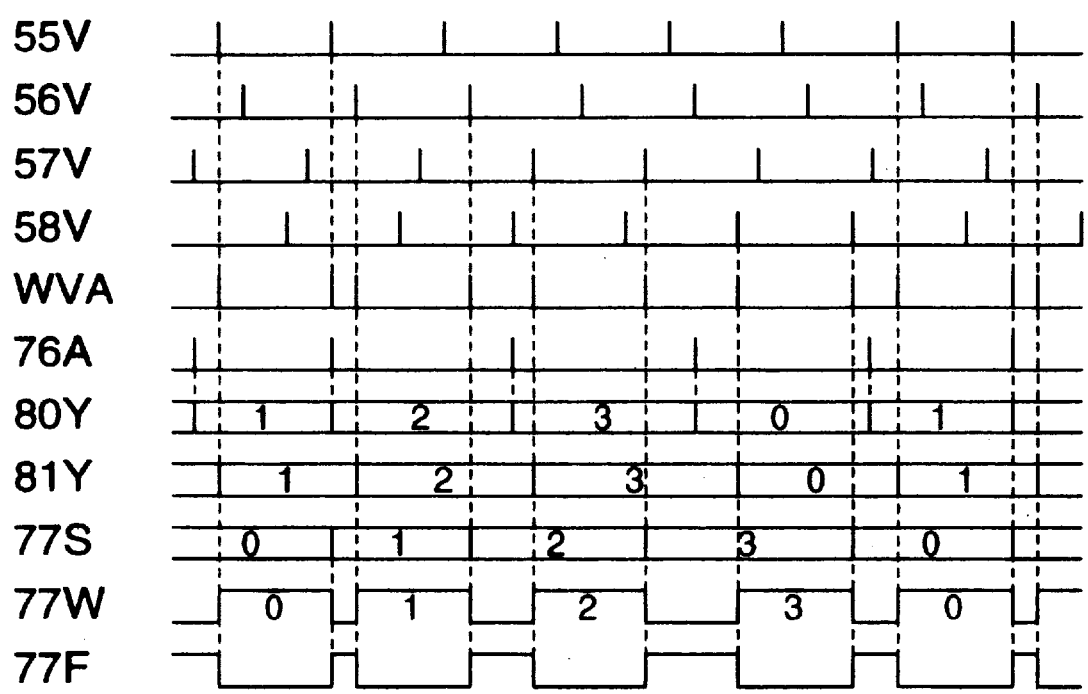
FIG. 17 is a timing chart showing the switching operation of a plurality of input video signals according to the second embodiment of FIG. 10.

In FIGS. 16 and 17, the counter 80 counts up by one each time a control pulse signal 76A of a predetermined period longer than that of the vertical sync signal is applied thereto from the select signal generating circuit 76 (FIG. 10). The counter 80 thus repeats the cycle of counts 0, 1, 2 and 3, and generates a 2-bit signal 80Y. The flip-flop circuit 81 fetches the 2-bit signal 80Y and outputs the same signal as a signal 81Y in synchronism with the timing of the vertical sync signal WVA for write operation from the sync separator circuit 11. Further, the flip-flop 82 operates the same way as the flip-flop 81 and outputs a signal 77S. The 2-bit signal thus is delayed by one field. The 2-bit output signals 81Y, 77S of the flip-flop circuits 81, 82 are compared by the comparator circuit 83 between each corresponding bits.

The comparator circuit 83 includes the exclusive OR circuits 84, 85 and the OR circuit 86 for comparing the signals 81Y and 77S, and in the case where there is any difference between the corresponding bits of the signals 81Y and 77S, produces a "H" signal. The output 77W of the comparator circuit 83, therefore, assumes a signal having a pulse width of one field sequentially switched for each video signal. This pulse signal 77W is applied to the line select circuit 73, the multiplexer 14 and the filter circuit 72 through the OR circuit of FIG. 10 as a signal representing the field immediately before write suspension.

The 2-bit output signal 77S of the flip-flop circuit 82 is supplied to the switch circuit 71 and used as a select control signal of the input video signal on the one hand and supplied to the write address generating circuit 75 and used as a select control signal for the processing areas of the field memories 21, 22 on the other hand. Assume that the video signals from the input terminals 55, 56, 57, 58 are selected by the switch circuit 71 when the 2-bit select signal 77S is 0, 1, 2, 3 in value, respectively, and that the vertical sync signals 55V, 56V, 57V, 58V of the respective input video signals 55, 56, 57, 58, respectively, are as shown in FIG. 17. The vertical sync signal of the video signal after being selected at the switch circuit 71, i.e., the output WVA of the sync separator circuit 11 assumes a form as shown in FIG. 17.

In FIG. 16, the output pulse signal 77W of the comparator circuit 83 is delayed by an amount equivalent to one vertical sync pulse VWA by the flip-flop circuit 87, and as a write suspension signal 77F reversed from the pulse signal 77W, supplied to the write signal generating circuit 74 through the OR circuit 79 and the AND gate 16 as shown in FIG. 10.

In this configuration, first assume that the count on the counter 80 is zero and the switch circuit 71 in FIG. 10 selects the video signal from the input terminal 55, which video signal is displayed as a compressed image sequence on the display screen.

When the counter 80 is counted up and the count thereon is updated to one, the screen select circuit 77 of FIG. 16 operates to raise the pulse signal 77W to "H" level during one field period. During this period, the same write operation is performed as in the field immediately before the write suspension for the freeze operation described above, and the odd-numbered lines of the input video signal are written in the storage areas of the field memories 21, 22 corresponding to the divided screen part a shown in FIG. 11.

The screen select circuit 77 generates a write suspension signal 77F at a timing of the vertical sync signal of the video signal immediately after the end of writing, whereby the write operation of the field memories 21, 22 is suspended. Also, the select control signal 77S is switched at the same timing, so that the switch circuit 71 is turned thereby to select the video signal from the input terminal 56. At the same time, the write address generated by the write address generating circuit 75 is switched to the storage areas of the field memories 21 and 22 corresponding to the divided screen part b shown in FIG. 11. After this switching operation, the write suspension signal 77F turns to "L" state at the timing of the vertical sync signal of the input video signal, thereby cancelling the write operation suspension of the field memories 21 and 22.

As a result of the above-mentioned operation, the video signal from the input terminal 55 is displayed in frozen state at the position of the divided screen part a of the display screen, and the video signal from the input terminal 56 is displayed as an image sequence at the position of the divided screen part b of the display screen.

Subsequently, the input video signal and the write position thereof are sequentially switched in similar fashion. In this way, the processing circuit 51 can display the four input image video signals compressed in the divided screen parts a to d of the display screen. In this case, the frozen image has a higher vertical resolution than the image sequence.

The pseudo display of image sequence can be accomplished by shortening the switching period of the video signals. Assume, for example, that the write period of each video signal is one field. The four video signals are asynchronous with each other, and the average out-of-phase condition is assumed to be 0.5 field for each field. The period from the writing of the video signal from a given input terminal to the writing of the next video signal is 1.5 fields on the average. In other words, the period from the writing of a given one of the four video signals from an input terminal to the next writing of the same video signal is 6 fields on the average. For a given compressed display screen part, therefore, the memory data are written at time intervals of six fields. If the field frequency is 60 Hz, it is possible to display 10 frames of image during one second.

The video signal is written always as a field immediately before write suspension. After switching a video signal, the next video signal is written at an interval of 0.5 fields on the average.

In the case where the switching output is unstable during the period before and after the switching of the video signal or in the case where a noise is generated in the sync signal 11Y output from the sync separator circuit 11, the circuit of FIG. 16 is altered in such a manner that the pulse width of the write suspension signal 77F is lengthened or the period of the control pulse signals 76A to 76D of the image select signal generating circuit 76 is lengthened.

As described above, according to this embodiment, a pseudo image sequence display of 16 mutually asynchronous video signals is accomplished without using a multiplicity of small-capacity image memory units. Also, a high temporal resolution is achieved as compared with the configuration in which 16 video signals are switched and written in the image memory unit of one system. Furthermore, a field of video signal is skipped by one half in vertical direction of the image and decomposed into two fields for freeze display. The vertical resolution, therefore, is higher than in a simple field freeze operation in which lines are skipped to one fourth in vertical direction.

It will thus be understood from the foregoing description that according to this invention, a high-quality compressed image can be displayed in frozen state with high vertical resolution. Also, a pseudo compressed image sequence can be displayed without using a multiplicity of small-capacity image memories.

What is claimed is:

1. An apparatus for displaying a plurality of compressed images, comprising at least a processing circuit supplied with a plurality of video signals of interlace type for producing a single video signal including a plurality of compressed images, said processing circuit including:

means for skipping at least one of said input video signals for conversion into a compressed image signal at least vertically by line;

a memory having two field storage areas for storing said compressed image signals by field;

means for generating addresses of said memory;

first select means for storing said compressed image signals in said two field storage areas alternately by field in accordance with said addresses;

means for suspending the write operation into said memory in order to display a frozen image;

skipping restriction means for causing said skipping means to suspend the skipping or reduce the rate of skipping to one half with respect to a field of said input video signal immediately before said write operation is suspended by said write operation suspension means;

second select means for storing said compressed image signals from said skipping means alternately between said two field storage areas by line according to said addresses;

means for reading said two field storage areas alternately by field; and means for producing a read signal from said read means as a compressed image display signal.

2. An apparatus according to claim 1, further comprising a filter for filtering at least the vertical frequency components according to a sampling theorem on the basis of the skipping process by said skipping means.

3. An apparatus according to claim 1, wherein said address generating means includes:

means for separating and retrieving the horizontal sync signal and the vertical sync signal of said input video signals; and means for generating said write addresses on the basis of said horizontal sync signal and said vertical sync signal.

4. An apparatus according to claim 1, wherein said skipping restriction means includes:

means for separating and retrieving the horizontal sync signal and the vertical sync signal of said input video signals; and means for selecting lines written in said memory on the basis of said horizontal sync signal and said vertical sync signal.

5. An apparatus according to claim 1, wherein said first select means includes:

means for separating and retrieving the horizontal sync signal and the vertical sync signal of said input video signals;

means for discriminating whether said input video signals represent odd fields or even fields on the basis of said horizontal sync signal and said vertical sync signal; and means for selecting said two field storage areas on the basis of the result of said discrimination by said discrimination means.

6. An apparatus according to claim 1, wherein said second select means includes:

means for separating and retrieving the horizontal sync signal and the vertical sync signal of said input video signals;

means for detecting the repetitive period of alternate storage by line on the basis of said horizontal sync signal and said vertical sync signal; and means for selecting said two field storage areas on the basis of the period detected by said detection means.

7. An apparatus according to claim 1, wherein said read means includes:

means for detecting which one of said two field storage areas is written in; and means for selecting and starting to read the field storage area not presently written in at the read start time point in accordance with the result of detection by said detection means.

8. An apparatus according to claim 7, wherein said read starting means includes means for assuring a correct interlacing by changing the number of the addresses of the read lines of the read video signals by one line for one of odd and even fields when reading video signals of even fields at the time when odd fields should otherwise be read or when reading video signals of odd fields at the time when even fields should otherwise be read.

9. An apparatus for displaying a plurality of compressed images, comprising at least a processing circuit supplied with a plurality of video signals of interlace type for producing a video signal including a plurality of compressed images, said processing circuit including:
   switch means for switching the application of each of n input video signals sequentially by field;
   means for skipping the input video signals from said switch means by line at least vertically for conversion into compressed image signals;
   a memory having two field storage areas for storing the input video signals from said switch means by field separately for odd fields and for even fields;
   means for generating addresses of said memory in correspondence with the respective display positions of the input video signals from said switch means;
   means for storing said compressed image signals by field in one of said corresponding two field storage areas in accordance with said addresses;
   means for reading said two field storage areas alternately by field; and
   means for producing a read signal from said read means as a compressed image display signal.

10. An apparatus according to claim 9, wherein said switch means constitutes means for counting at least n−1 clocks having a longer period than said horizontal sync period and switching n input video signals in accordance with the count value thereof.

11. An apparatus according to claim 9, wherein said switch means includes:
   a switch circuit for switching said n input video signals sequentially;
   a counter for counting at least n−1 clocks having a longer period than the horizontal sync signal;
   a first flip-flop for storing the count value of said counter in synchronism with the horizontal sync signal of the input video signal selected by said switch circuit;
   a second flip-flop for storing the output value of said first flip-flop in synchronism with said horizontal sync signal; and
   means for instructing a field of the input video signal selected by said switch circuit to be written in said memory on the basis of the output signals of said first and second flip-flops.

12. An apparatus for displaying a compressed image, comprising:
   input means for receiving an input video signal having lines arranged in two interlaced fields;
   a memory having two field storage areas;
   skipping means for skipping lines of the input video signal to produce a compressed image signal having lines arranged in two interlaced fields, and supplying the compressed image signal to the memory;
   first memory controlling means for controlling the memory to store the compressed image signal in the two field storage areas alternately by field such that one field of the compressed image signal is stored in one of the field storage areas, and then another field of the compressed image signal is stored in another one of the field storage areas;
   memory storing operation suspending means for suspending a storing operation of the memory when a still image is to be displayed;
   skipping restricting means for controlling the skipping means to stop skipping lines of the input video signal, or to reduce by one half a rate of skipping lines of the input video signal, for one field of the input video signal occurring immediately before the memory storing operation suspending means suspends the storing operation of the memory;
   second memory controlling means for controlling the memory to store the one field of the compressed image signal for which skipping of lines has been stopped or reduced in the two storage areas alternately by line such that one line of the one field for which skipping of lines has been stopped or reduced is stored in one of the field storage areas, and then a next line of the one field for which skipping of lines has been stopped or reduced is stored in another one of the field storage areas;
   third memory controlling means for controlling the memory to read out the compressed image signal from the two field storage areas alternately by field such that an entire portion of the compressed image signal stored in one of the field storage areas is read out, and then another entire portion of the compressed image signal stored in another one of the field storage areas is read out; and
   output means for outputting a compressed image display signal based on the compressed image signal read out from the two field storage areas alternately by field.

13. An apparatus according to claim 12, further comprising a filter for removing vertical frequency components of the compressed image signal before the compressed image signal is supplied to the memory according to a sampling theorem based on the skipping of lines of the input video signal by the skipping means.

14. An apparatus according to claim 12, wherein the input video signal includes a horizontal sync signal and a vertical sync signal;
   wherein the apparatus further comprises sync signal separating means for separating the horizontal sync signal and the vertical sync signal from the input video signal; and
   wherein the first memory controlling means and the second memory controlling means each control the memory based on the horizontal sync signal and the vertical sync signal.

15. An apparatus according to claim 12, wherein the input video signal includes a horizontal sync signal and a vertical sync signal;
   wherein the apparatus further comprises sync signal separating means for separating the horizontal sync signal and the vertical sync signal from the input video signal; and
   wherein the skipping restricting means includes means for selecting lines of the input video signal to be stored in the two field storage areas based on the horizontal sync signal and the vertical sync signal.

16. An apparatus according to claim 12, wherein the input video signal includes a horizontal sync signal and a vertical sync signal;
   wherein the apparatus further comprises sync signal separating means for separating the horizontal sync signal and the vertical sync signal from the input video signal; and
   wherein the first memory controlling means includes:
      discriminating means for discriminating whether a line of the input video signal belongs to an odd field of the input video signal or an even field of the input video signal based on the horizontal sync signal and the vertical sync signal; and selecting means for selecting one of the two field storage areas based on a result of the discriminating by the discriminating means.

17. An apparatus according to claim 12, wherein the input video signal includes a horizontal sync signal and a vertical sync signal;

wherein the apparatus further comprises sync signal separating means for separating the horizontal sync signal and the vertical sync signal from the input video signal; and wherein the second memory controlling means includes:
detecting means for detecting a line period of the compressed image signal based on the horizontal sync signal and the vertical sync signal; and
selecting means for selecting one of the two field storage areas based on the line period detected by the detecting means.

18. An apparatus according to claim 12, wherein the third memory controlling means includes:

detecting means for detecting which one of the two field storage areas the compressed image signal is currently being stored in; and reading means for reading the compressed image signal from one of the two field storage areas which the compressed image signal is not currently being stored in based on a result of the detecting by the detecting means.

19. An apparatus according to claim 18, wherein the reading means includes interlacing correcting means for correcting interlacing of fields of the compressed image display signal by changing a timing of reading the compressed image signal by one line when the reading means is reading an even field of the compressed image signal when an odd field should be displayed, or is reading an odd field of the compressed image signal when an even field should be displayed.

20. An apparatus for displaying a compressed image, comprising:

an input circuit which receives an input video signal having lines arranged in two interlaced fields;

a memory having two field storage areas;

a skipping circuit which skips lines of the input video signal to produce a compressed image signal having lines arranged in two interlaced fields, and supplies the compressed image signal to the memory;

a first memory controlling circuit which controls the memory to store the compressed image signal in the two field storage areas alternately by field such that one field of the compressed image signal is stored in one of the field storage areas, and then another field of the compressed image signal is stored in another one of the field storage areas;

a memory storing operation suspending circuit which suspends a storing operation of the memory when a still image is to be displayed;

a skipping restricting circuit which controls the skipping circuit to stop skipping lines of the input video signal, or to reduce by one half a rate of skipping lines of the input video signal, for one field of the input video signal occurring immediately before the memory storing operation suspending circuit suspends the storing operation of the memory;

a second memory controlling circuit which controls the memory to store the one field of the compressed image signal for which skipping of lines has been stopped or reduced in the two storage areas alternately by line such that one line of the one field for which skipping of lines has been stopped or reduced is stored in one of the field storage areas, and then a next line of the one field for which skipping of lines has been stopped or reduced is stored in another one of the field storage areas;

a third memory controlling circuit which controls the memory to read out the compressed image signal from the two field storage areas alternately by field such that an entire portion of the compressed image signal stored in one of the field storage areas is read out, and then another entire portion of the compressed image signal stored in another one of the field storage areas is read out; and an output circuit which outputs a compressed image display signal based on the compressed image signal read out from the two field storage areas alternately by field.

21. An apparatus according to claim 20, further comprising a filter which removes vertical frequency components of the compressed image signal before the compressed image signal is supplied to the memory according to a sampling theorem based on the skipping of lines of the input video signal by the skipping circuit.

22. An apparatus according to claim 20, wherein the input video signal includes a horizontal sync signal and a vertical sync signal;

wherein the apparatus further comprises a sync signal separating circuit which separates the horizontal sync signal and the vertical sync signal from the input video signal; and wherein the first memory controlling circuit and the second memory controlling circuit each control the memory based on the horizontal sync signal and the vertical sync signal.

23. An apparatus according to claim 20, wherein the input video signal includes a horizontal sync signal and a vertical sync signal;

wherein the apparatus further comprises a sync signal separating circuit which separates the horizontal sync signal and the vertical sync signal from the input video signal; and wherein the skipping restricting circuit includes a selecting circuit which selects lines of the input video signal to be stored in the two field storage areas based on the horizontal sync signal and the vertical sync signal.

24. An apparatus according to claim 20, wherein the input video signal includes a horizontal sync signal and a vertical sync signal;

wherein the apparatus further comprises a sync signal separating circuit which separates the horizontal sync signal and the vertical sync signal from the input video signal; and wherein the first memory controlling circuit includes:
a discriminating circuit which discriminates whether a line of the input video signal belongs to an odd field of the input video signal or an even field of the input video signal based on the horizontal sync signal and the vertical sync signal; and
a selecting circuit which selects one of the two field storage areas based on a result of the discriminating by the discriminating circuit.

25. An apparatus according to claim 20, wherein the input video signal includes a horizontal sync signal and a vertical sync signal;

wherein the apparatus further comprises a sync signal separating circuit which separates the horizontal sync signal and the vertical sync signal from the input video signal; and wherein the second memory controlling circuit includes:
- a detecting circuit which detects a line period of the compressed image signal based on the horizontal sync signal and the vertical sync signal; and
- a selecting circuit which selects one of the two field storage areas based on the line period detected by the detecting circuit.

26. An apparatus according to claim 20, wherein the third memory controlling circuit includes:
- a detecting circuit which detects which one of the two field storage areas the compressed image signal is currently being stored in; and
- a reading circuit which reads the compressed image signal from one of the two field storage areas which the compressed image signal is not currently being stored in based on a result of the detecting by the detecting circuit.

27. An apparatus according to claim 26, wherein the reading circuit includes an interlacing correcting circuit which corrects interlacing of fields of the compressed image display signal by changing a timing of reading the compressed image signal by one line when the reading circuit is reading an even field of the compressed image signal when an odd field should be displayed, or is reading an odd field of the compressed image signal when an even field should be displayed.

* * * * *